S. E. FOSTER.
Springs for Vehicles.
No. 154,469. Patented Aug. 25, 1874.
FIG. I.
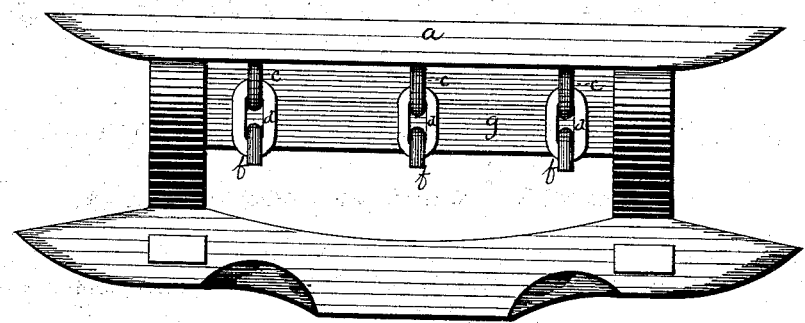
FIG. II.
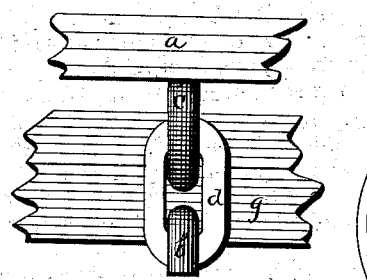
FIG. III.
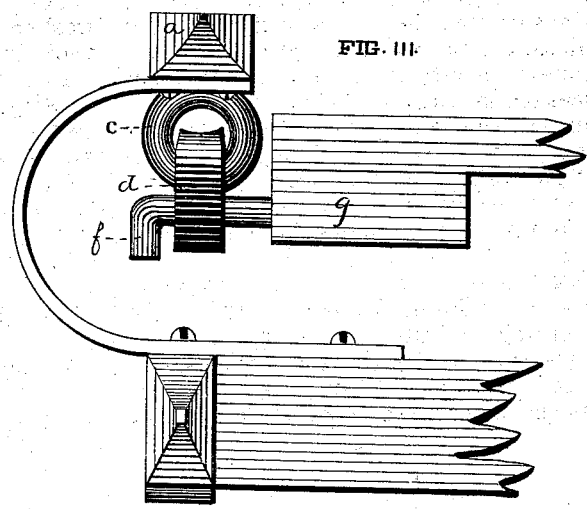

UNITED STATES PATENT OFFICE.

STEPHEN E. FOSTER, OF MINNEAPOLIS, MINNESOTA.

IMPROVEMENT IN SPRINGS FOR VEHICLES.

Specification forming part of Letters Patent No. 154,469, dated August 25, 1874; application filed July 24, 1874.

*To all whom it may concern:*

Be it known that I, STEPHEN E. FOSTER, a resident of the city of Minneapolis, county of Hennepin and State of Minnesota, have invented certain new and useful Improvements in Springs for Vehicles, of which the following is a full, clear, and exact description, the drawings annexed hereto being made a part of this specification, in which—

Figure 1 is an end view of a vehicle-body hung with my device, Figs. 2 and 3 being details of the spring and its connections.

The same letters of reference are used in the various figures in the designation of identical parts.

The bar $a$ is supported by two curved metal supports, $h\ h$. From the bar $a$ depend the rubber springs $d$, being held in place by the clasps $c$ of the bar $a$. From out the body $g$ extend the metal hooks $f$, over which the rubber springs $d$ are passed. The number of these hooks correspond with the number of springs used, and may be placed centrally upon the outside of the box, or near the upper or lower edge, as may be required. Around the hooks $f$ (see Fig. 3) and the clasp $c$ are the washers $e$, made of any material that will prevent the wear of the springs $d$.

I am aware that rubber has heretofore been used for springs for vehicles; but I am not aware that the same has ever before been used in the way and shape herein described.

Having thus described my invention, what I claim, and want to secure by Letters Patent, is—

In combination with the rubber spring $d$, the hook $f$, and clasp $c$, substantially as described, and for the purposes specified.

STEPHEN E. FOSTER.

Witnesses:
O. M. PARSONS,
A. F. ELLIOT.